United States Patent [19]

Koutsoupidis

[11] Patent Number: 4,904,145
[45] Date of Patent: Feb. 27, 1990

[54] STUD WITH AN ADAPTED HEAD

[76] Inventor: Theodore Koutsoupidis, Kecropos 39,, Glyfada, Athens 166-75, Greece

[21] Appl. No.: 925,674

[22] Filed: Oct. 31, 1986

[51] Int. Cl.[4] .............................................. F16B 23/00
[52] U.S. Cl. .................................... 411/396; 10/27 R;
29/522.1; 411/480; 411/945
[58] Field of Search .............. 411/396, 397, 945, 480,
411/372, 371, 429; 29/522.1; 10/27 R

[56] References Cited

U.S. PATENT DOCUMENTS

| | | | |
|---|---|---|---|
| 657,256 | 9/1900 | Tipton | 411/945 X |
| 715,270 | 12/1902 | Karus | 411/945 X |
| 880,065 | 2/1908 | Brunello | 411/945 X |
| 1,617,557 | 2/1927 | Weatherhead Jr. | 29/522.1 X |
| 1,915,245 | 6/1933 | Cook | 411/945 X |
| 2,169,460 | 8/1939 | Broughton | 10/27 R |
| 2,369,856 | 2/1945 | Roberts | 411/954 X |
| 2,596,780 | 5/1952 | Meyers et al. | 411/372 X |
| 3,599,528 | 8/1971 | Kushnick | 411/337 |
| 3,978,758 | 9/1976 | Bright | 411/397 |
| 4,213,607 | 7/1980 | Fujii | 29/522 R X |
| 4,404,995 | 9/1983 | Bowen et al. | 29/522 R X |
| 4,540,322 | 9/1985 | Coffia | 411/338 |

FOREIGN PATENT DOCUMENTS

| | | | |
|---|---|---|---|
| 756524 | 9/1933 | France | 411/397 |
| 760998 | 11/1956 | United Kingdom | 411/397 |

Primary Examiner—Lloyd A. Gall

[57] ABSTRACT

A stud is formed with an extension to permanently hold an adapted-head by means of a forged pin. The nut-head is designed to be able to withstand torsional and shearing stresses. The extension is especially designed to form a head in conjunction with a nut-head and a pin which is forged in between. The stud-head is designed to withstand torsional and shearing stresses limited to that amount applied to the shank.

1 Claim, 1 Drawing Sheet

STUD WITH AN ADAPTED HEAD

CROSS-REFERENCE TO RELATED APPLICATIONS

The invention relates to a new improved method for bolt manufacturing. A number of manufacturing processes of producing bolts being used are: machining and forging by hot and cold heading process. The disadvantages of the above are: the machining process produces a great amount of scrap metal which can be expensive if no automation is used; hot heading is high cost due to a large amount of energy needed and expensive dyes used; cold heading process' limitation is due to metal structure behavior.

SUMMARY OF THE INVENTION

This invention pertains to a new method of manufacturing process for bolts. The bolt is assembled by means of two elements; the first element is a stud and the second element is the combination of an elongated pin and a nut head.

The stud includes an extension and a threaded shank. The nut head is slidably engaged by the extension. Also the nut-head has a cylindrical bore radially extending through to be aligned with a bore passage formed at the shank of a stud. An elongated pin is inserted in the cylindrical cavity of the stud and through the passage of the nut-head; the extending opposite ends of the elongated pin are forged into the passage and the cavity to engage the nut head at the shank of the stud.

FIELD OF THE INVENTION

The primary object of this invention is to provide a light bolt mainly to be used for the fuselage of aircrafts and also for vehicles.

Another primary object of this invention is to provide low cost fastener, yet durable construction using the least amount of materials and further to eliminate wasted material during machining especially when hard or expensive metal alloys are used.

Another objective of this invention is to introduce a new method of manufacturing process designed for mass production.

The new economy method of manufacturing process produces a stud with a built-on head by using the least amount of materials necessary without affecting durability.

DETAIL DESCRIPTION OF THE PREFERRED EMBODIMENTS.

Figure 2:
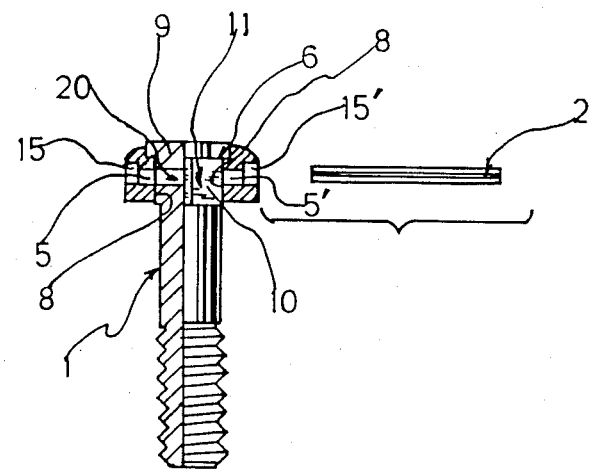
FIG. 2 is a longitudinal section of the stud taken on the line 2—2 of FIG. 1 and also shows the pin 2 outside the pin-receiving bores.
Figure 1:
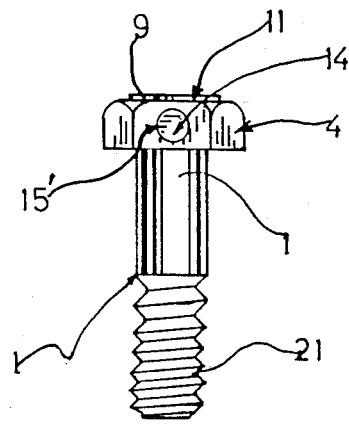
FIG. 1 is a side view of a stud with a built-on head illustrating this invention.

In FIG. 1 the preferred embodiment is illustrated where a stud is used to build a bolt. Stud 1 includes an extension 11 and a threaded shank 21 dependent therefrom, illustrated in FIG. 2, with the extension 11 being divided into a cube portion 10 and a cylindrical protuberance 9. Nut-head 4 is mounted upon extension 11 of the stud 1 with an elongated pin 2 holding the nut-head against the cylindrical protruberance referenced in FIG. 3. With reference to FIG. 2 which is a partial section view of stud 1, cube portion 10 of extension 11 has a passage 20 passing transversly therethrough and the nut-head has opposing cylindrical cavities 5 and 5' which are aligned with the ends of passage 20. Elongated pin 2 passes through cavities 5—5' and passage 20 to retain nut-head 4 in place on extension 11. Cylindrical cavities 5 and 5' extend towards the walls to opposite cavities 15 and 15'. Opposite ends 18 and 18' of the elongated pin extend through opposite cavities 15 and 15'. The opposite ends 18 and 18' of the elongated pin 2 are headed by forging to form a rivet head 14 in the cavities 15 and 15', which rivets the nut-head securely to the extension 11 of the stud 1.

FIG. 2 illustrates in section view the stud with a built-on head. Stud 1 illustrated in FIG. 3, being divided into a threaded rod 21 and an extension 11.

The cube extension 10 has a passage 20 extending radially through. Cube porton 10 is further axially extended to a cylindrical protuberance 9. Extension 11 engages a nut-head 4 illustrated in FIG. 2. The nut-head 4 is a hexagonal nut having an axial bore unthreaded and furthermore being divided into cylindrical bore 6 and cube cavity 8. The cube portion 8 is smaller in dimension than the cylindrical protuberance 9. Nut-head has a cylindrical cavity 5 and 5' extending through the walls to opposite cavities 15 and 15'. Pin element 2 passes through passage 20 and the cylindrical cavity 5 and 5' to retain nut-head 4 in the extension of the stud 1. The extreme ends 18 and 18' of the elements 2 are forged along the longitudinal axis of the cube passage 20 and the opposite cavities 15 and 15' of the nut head 4.

Figure 3:
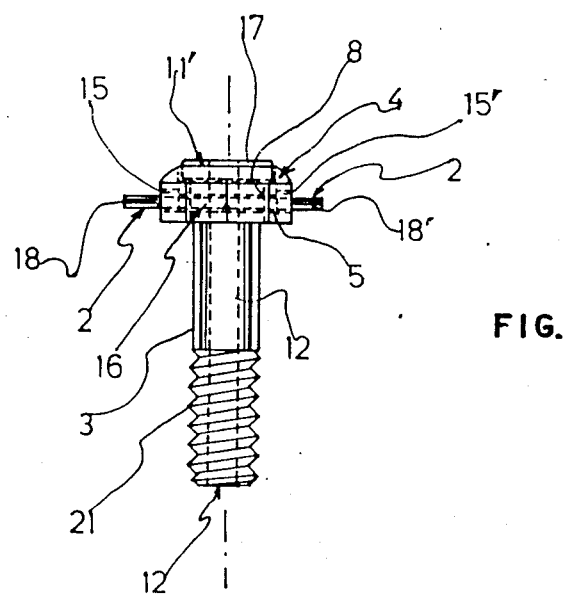
FIG. 3 is an elevation view of the embodiment of FIG. 2 with the pin being placed in the pin-receiving bores.

FIG. 3 illustrates a stud having a bore 12 extending axially through the shank 3. A cylindrical pin 2 is inserted in the pin-receiving bores 5, 5' and 15, 15' of the nut-head and the cube extension 16, where the opposite ends 18 and 18' extend beyond the nut-head before the final stage of the manufacturing process. At the final stage the pin is being forged in the opposite cavities 15 and 15'. The shank includes at one end an extension 11', defined by a cube portion 16 extended to a cylindrical protuberance 17.

FIG. 1, 2 illustrate a stud with an adapted head. The stud 1 at one end formed by means of a cube portion 10 extends to a cylindrical protuberance 9, therefore defining the extension. The cube 10 is slightly larger than the diameter of the shank 21. The protuberance 9 overlaps the cube 10. The cube has a bore 20 aligned with the cylindrical cavity of the nut-head. The cube 10 formed to absorb the torsional shear stress applied by the tool. The nut-head 4 rested against the extending protuberance 9 reduces the amount of the shearing and bending stress applied at the elongated pin 2 when fastened to it. The nut head has a cube receiving bore 8 and a cylindrical receiving bore 6. The cube engagement is designed to withstand torsional stress and the cylindrical protuberance in conjunction with the forged pin is designed to withstand shearing stresses. The opposite ends 18 and 18' of the pin are forged in the opposite cavities 5 and 5' of the nut head. The molecular structure of the pin is changed by forging, therefore increasing the strength of the metal to withstand large amounts of shearing and bending stresses. A portion of the nut head is engaged between the cylindrical protuberance and the pin 2 illustrated in FIG. 2. The nut head acts as a cushion for the bending and shear stress at the pin 2 for any hoop and shear stresses applied to the protuberance; therefore the pin 2 acts partially as a head for the stud as well as an interlocking member.

With the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What I claim is:

1. A bolt member comprising plural elements, a first element comprising a shank with a threaded portion at one end and an extension at the other end thereof, said extension defined by a cube portion extending radially outwardly beyond said shank and a cylindrical protuberance extending radially outwardly beyond said cube portion, said cube portion having a radial passage extending therethrough, said shank having a bore extending axially therethrough;

a second element comprising a nut head received on said extension of said shank, said nut head having a cube opening and cylindrical bore for reception of said cube portion and cylindrical protuberance, respectively; said nut head having a cavity on each side of said cube opening;

and a third element comprising an elongated pin of relatively hard but deformable metal received through said nut head cavities and said radial passage and having its ends forged into said nut head cavities to secure said nut head to said shank.

* * * * *